(12) United States Patent
Subramanian et al.

(10) Patent No.: US 7,603,658 B2
(45) Date of Patent: Oct. 13, 2009

(54) APPLICATION FUNCTIONALITY FOR A TEST TOOL FOR APPLICATION PROGRAMMING INTERFACES

(75) Inventors: Sowmya Subramanian, Mountain View, CA (US); Larry Dean Harris, Belmont, CA (US); Sandeep Khemani, Fremont, CA (US); Thomas W. Nickerson, Independence, CA (US); George A. Buzsaki, Fremont, CA (US); Michael De Groot, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 674 days.

(21) Appl. No.: 10/991,607

(22) Filed: Nov. 17, 2004

(65) Prior Publication Data

US 2005/0193291 A1 Sep. 1, 2005

Related U.S. Application Data

(60) Provisional application No. 60/546,451, filed on Feb. 19, 2004.

(51) Int. Cl.
*G06F 9/44* (2006.01)
(52) U.S. Cl. ............................ 717/126; 717/124
(58) Field of Classification Search .......... 717/100, 717/106, 110, 111, 112, 114, 120, 122, 124, 717/168, 170, 174, 175, 126
See application file for complete search history.

(56) References Cited

U.S. PATENT DOCUMENTS 6,836,777 B2 * 12/2004 Holle ..................... 707/101
7,028,223 B1 * 4/2006 Kolawa et al. .......... 714/38
7,272,822 B1 * 9/2007 Riggins et al. .......... 717/124
7,305,659 B2 * 12/2007 Muller et al. ........... 717/127
7,478,365 B2 * 1/2009 West et al. .............. 717/124
7,519,953 B2 * 4/2009 Reissman et al. ....... 717/124
2004/0025083 A1 * 2/2004 Nanja et al. ............. 717/124
2004/0128652 A1 * 7/2004 Mandava et al. ........ 717/124

OTHER PUBLICATIONS

Hoffman et al., "Tools and Techniques for Java API Testing", IEEE, 2000, 11 pgs.*
Shelton et al., "Robustness Testing of the Microsoft Win32 API", IEEE, 2000, 10 pgs.*

* cited by examiner

*Primary Examiner*—Wei Y Zhen
*Assistant Examiner*—Ryan D Coyer
(74) *Attorney, Agent, or Firm*—Aka Chan LLP

(57) ABSTRACT

Methods and apparatus for enabling efficient testing of application programming interface (API) frameworks and application code are disclosed. According to one aspect of the present invention, a framework suitable for use to test an API includes a metadata provider arrangement that stores declarative metadata and a metadata provider interface that obtains the declarative metadata associated with a test from the declarative metadata provider. A first test adapter includes logic used to process the declarative metadata, and a diagnostic test interface cooperates with the first test adapter to execute the test. The first test adapter is effectively interfaced with the diagnostic test interface. Finally, a diagnostics execution engine is arranged to communicate with the diagnostic test interface to cause the test to be executed.

47 Claims, 10 Drawing Sheets

```xml
<APITestType language="JAVA" id="createAccount" methodName="open"
    class="com.usbc.banking.retail.CheckingAccount">
  <Description>This API creates new checking account for a new or an
    existing customer for the bank. Internally, this API updates the core
    customer tables with mandatory information required for creating a
    new account </Description>
  <ErrorInfo type="NORMAL ERROR">
    <message>Some mandatory customer information was invalid or
      missing.</message>
    <fixInfo>Before calling this API, ensure that mandatory customer
      information is valid. Refer to report for details.</fixInfo>
  </ErrorInfo>

<InputParams>
    <InputParam sequence="1" name="firstName" type="java.lang.String"
      value="John" />
    <InputParam sequence="2" name="lastName" type="java.lang.String"
      value="Doe" />
    <InputParam sequence="3" name="dob" type="java.sql.Date"
      value="1973-21-06" />
    <InputParam sequence="4" name="address" type="java.lang.String"
      value="600 Oracle Parkway. Redwood City, CA 94065" />
    <InputParam sequence="5" name="phone" type="java.lang.String"
      value="650-650-6500" />
    <InputParam sequence="6" name="initialDeposit_USD" type="java.lang.Integer"
      value="10000" />
    <InputParam sequence="7" name="socialSecNumber" type="java.lang.String"
      value="9999-99-9999" />
  </InputParams>

<OutputParams>
    <OutputParam name="accountNumber" type="int"
      target="${data.newAccountNum}" operation="NONE" />
  </OutputParams>

</APITestType>
```

Fig. 2

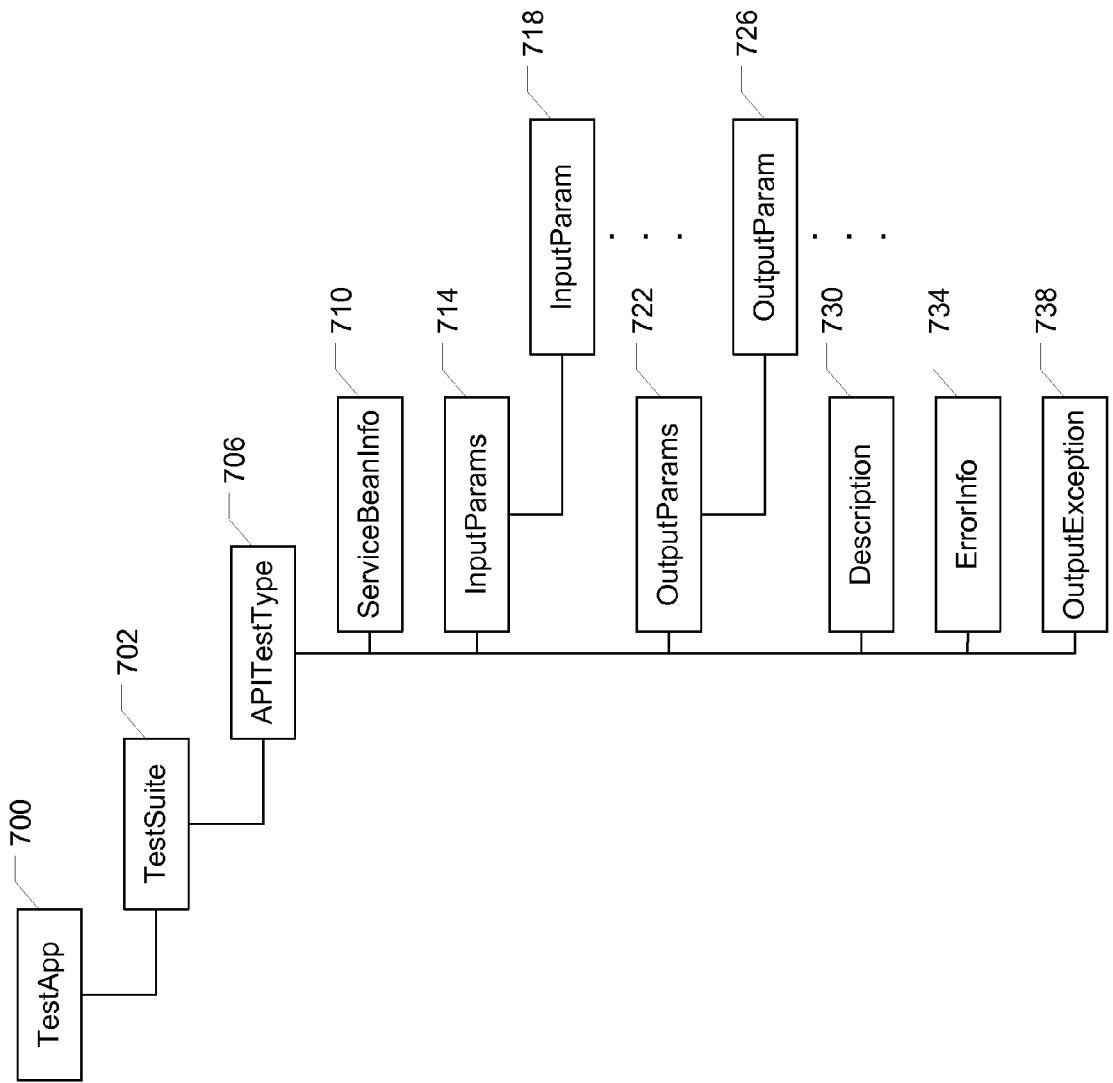

```xml
<TestApp AppShortName="USBC" AppFullName="United States Banking Corp." file-         ─ 800
   version="$Header: USBC_Diagnostics.xml 115.6 2003/11/10 08:30:28 skhemani noship
   $">       ─ 802
-  <TestSuite ComponentIdentifier="Account Functionality" EnvDetail=""
      SecurityLevel="LOW">       ─ 806a
   +  <APITestType language="JAVA" id="createAccount" methodName="open"
         class="com.usbc.banking.retail.CheckingAccount">
   +  <APITestType language....       ─ 806b
            .
            .               ─ 806c
-  <APITestType language="JAVA" id="AccountBalanceAfterDeposit" methodName="getBalance"
      class="com.usbc.banking.retail.CheckingAccount">
      <Description>Given an account number, this API will return the new balance after
830     making a deposit into the account.</Description>
   -  <ErrorInfo type="NORMAL ERROR">
834     <message>Please check the account number.</message>
         <fixInfo>The account number must be valid.</fixInfo>
      </ErrorInfo>
   -  <InputParams>       ─ 814
                          ─ 818
         <InputParam sequence="1" name="account" type="int"
            source="${data.newAccountNum}" />
      </InputParams>       ─ 822
   -  <OutputParams>       ─ 826
         <OutputParam name="balance" type="int" value="20000" operation="" />
      </OutputParams>
   </APITestType>
   +  <APITestType language....       ─ 806d
            .
            .
   </TestSuite>
</TestApp>
```

Fig. 4

```xml
                    ┌─ 856
<SQLTestType TestedComponent="Application Data"
            ┌─ 880         TestName="Test Application Registered">
    <Description>
            Test checks if there exists a corresponding
            application name for the given application id.
884 ─╲</Description>
    <ErrorInfo type="FATAL">
        <message>Application could not be found</message>
        <fixInfo>
            Make sure that for the app id, there is an application
        </fixInfo>
    </ErrorInfo>
      <SQL>
862 ─╱      declare
            status number := 0; report varchar(4000); p_appname varchar(4000);

begin
            select distinct application_name into p_appname
            from fnd_application_vl      where APPLICATION_ID like ?;

report := 'The application exists that '
            || 'exists in the system for the ID is: '
            || p_appname;

status := 0; -- success
            ? := p_appname; ? := status; ? := report;
            end;
      </SQL>        ┌─ 864
    <InputParams sequence="1">
        <InputParam name="APPLICATION_ID" value="690" type="java.lang.Integer"
                ─ 868                                          sqlBindIndex="1"/>
    </InputParams> ┌─ 872
    <OutputParams>
        <OutputParam name="APPLICATION_NAME" type="java.lang.String"
876 ─╱                                      sqlBindIndex="2" target="$(data.appID)"/>
        <OutputParam name="TEST_STATUS" type="java.lang.Integer"
876 ─╱                                                         sqlBindIndex="3"/>
        <OutputParam name="TEST_REPORT" type="java.lang.String"
876 ─╱                                                         sqlBindIndex="4"/>
    </OutputParams>
</SQLTestType>
```

Fig. 6

APPLICATION FUNCTIONALITY FOR A TEST TOOL FOR APPLICATION PROGRAMMING INTERFACES

CROSS REFERENCE TO RELATED PATENT APPLICATION

This patent application claims priority to U.S. patent provisional application 60/546,451, entitled "API Test Tool," filed Feb. 19, 2004, which is incorporated herein by reference in its entirety. This patent application is related to copending U.S. patent application Ser. No. 10/991,883 and Ser. No. 10/991,608, filed concurrently herewith, which are each incorporated herein by reference in their entireties.

BACKGROUND OF THE INVENTION

1. Field of Invention

The present invention relates to database systems. More specifically, the invention relates to an application programming interface (API) testing system which enables API frameworks and application code to be efficiently tested.

2. Description of the Related Art

An application programming interface (API) is the interface used, or the calling conventions used, to allow an application program to access an operating system, as well as other system resources. APIs are often defined at a source code level, and effectively enable a level of abstraction to be present between an application program and a kernel such. In some instances, an API may provide an interface between a high level language and lower level services, particularly those services or utilities which may have been written without taking into account calling conventions of compiled languages.

Testing of framework and application code associated with APIs is important to ensure that APIs function as intended. Without thorough testing of the framework and the application code associated with APIs, any errors or other unexpected results which may occur when an API is put into use may not be found until the API is used. When an API that is in use fails to function as intended, an application program which uses the API may be prevented from operating as desired.

Typically, for each test case associated with an API, a specific API test is coded and developed. The requirements for valid API tests on a framework and application code may be prohibitive in that a generally high number of tests are typically needed, and many issues may arise relating to the management of the tests. Hence, the requirements for comprehensive API tests on a framework and application code are often considered to be too extensive for comprehensive tests to be productive. As a result, API tests are likely to only be written to test code or test cases which are considered to be critical. In other words, not all APIs may be thoroughly tested.

When only some test cases associated with an API are subjected to API testing, the reliability of the API may be compromised, as the framework and application code associated with the API is not fully tested. Since the overhead and the overall costs associated with comprehensively testing the framework and application code associated with the API is generally prohibitive, many developers and users are electing to write API tests for only the most crucial test code or test cases.

Therefore, what is needed is a method and an apparatus which enables the framework and application code associated with an API to be efficiently tested. That is, what is desired is an API test tool which provides a framework which allows API tests to be readily developed.

SUMMARY OF THE INVENTION

The present invention relates to the efficient testing of application programming interface (API) frameworks and application code. According to one aspect of the present invention, a framework suitable for use to test an API includes a metadata provider arrangement that stores declarative metadata and a metadata provider interface that obtains the declarative metadata associated with a test from the declarative metadata provider. A first test adapter includes logic used to process the declarative metadata, and a diagnostic test interface cooperates with the first test adapter to execute the test. The first test adapter is effectively interfaced with the test interface. Finally, an execution engine is arranged to communicate with the test interface to cause the test to be executed.

In one embodiment, the framework also includes a second test adapter that is interfaced with the test interface. In such an embodiment, the first test adapter and the second test adapter each include a generic adapter portion, and the first test adapter provides a first extension to the generic adapter portion while the second test adapter provides a second extension to the generic adapter portion.

Test adapters generally contain the processing logic needed to essentially transform test metadata into test interfaces which cooperate with a test engine for API test execution and report generation. There may be multiple test adapters processing different parts of test metadata. However, each test adapter includes a generic adapter portion which defines the core data that each test adapter processes. One mechanism that may be used to extend a framework which uses adapters is to associate new adapters for new tags within test metadata. The ability of a testing engine to be integrated with any number of custom adapters is effectively enabled by substantially ensuring that the adapter classes conform to the standards desired by a metadata provider. By conforming to the standards, the custom adapters effectively identify themselves as adapters to the metadata provider.

An extensible API testing framework which includes adapters which effectively implement testing logic allows the functionality of the API testing framework to be efficiently extended without generating significant amounts of code. When a new type of test is to be supported by the testing framework, a custom adapter may be created for each type of test. In other words, a custom adapter may be created for each new type of test. Within such a custom adapter, a generic portion which is common to substantially all adapters interfaced with the test interface defines a set of tags which may be used in test scripts for each type of test. Each custom adapter may generally extend the functionality of the generic portion, which may be considered to a building block for each adapter.

According to another aspect of the present invention, a method within an adapter class is arranged for processing test data that has declarative metadata within a testing framework that has a first adapter arranged to handle the test data includes analyzing the test data and creating a test interface object. The test interface object stores the test data as at least a first set of information and a second set of information. The first set of information is associated with declarative metadata and the second set of information is associated with metadata in general. In one embodiment, the method also includes executing a test associated with the test data using the test interface object, wherein an execution layer of the testing framework causes the test to be executed.

The methods of an adapter class enable the execution layer of a test framework to execute a desired test as specified in the test metadata. This is made possible by ensuring that a test interface object generated by the adapter contains the logic to invoke the test associated with the test metadata.

In accordance with still another aspect of the present invention, a method for running an API test includes obtaining test data which includes declarative metadata using a test declarative metadata adapter of a first class. The method also includes providing the test data to a diagnostic test interface and executing a test associated with the test data using the diagnostic test interface. Executing the test associated with the test data using the diagnostic test interface includes calling a first test adapter of the first class to obtain testing logic for executing the test associated with the test data. The first test adapter is arranged to include a generic test adapter portion that defines at least one tag that is common to a plurality of test adapters of the first class and a test adapter portion that defines at least one tag that is not common to the plurality of test adapters of the first class.

According to yet another aspect of the present invention, a framework suitable for use to test an API includes a metadata provider arrangement, a test declarative metadata adapter arrangement, a first test adapter arrangement, and a diagnostic test interface. The metadata provider arrangement stores declarative metadata associated with the test, and the test declarative metadata adapter arrangement marshals and unmarshals the declarative metadata associated with the test from the metadata provider arrangement. The diagnostic test interface being arranged to cooperate with the first test adapter arrangement to execute the test, wherein the first test adapter arrangement is effectively interfaced with the diagnostic test interface.

In accordance with yet another aspect of the present invention, a method for extending functionality associated with a testing framework which includes a repository arranged to store metadata, a diagnostics execution engine, a diagnostic test interface, and an API test adapter involves creating a first test adapter to perform a first type of test. Creating the first test adapter includes incorporating a first portion with a first set of declarative metadata tags, which is also included in the API test adapter, and a third portion that extends the first portion. The first test adapter is then interfaced with the diagnostic test interface.

Other features and advantages of the invention will become readily apparent upon review of the following description in association with the accompanying drawings, where the same or similar structures are designated with the same reference numerals.

BRIEF DESCRIPTION OF THE DRAWINGS

The invention may best be understood by reference to the following description taken in conjunction with the accompanying drawings in which:

FIG. 2 is a representation of an XML schema definition of an API test in accordance with an embodiment of the present invention.

FIG. 3 is a diagrammatic representation of a first XML tag structure which is used within an overall test application in accordance with an embodiment of the present invention.

FIG. 4 is a representation of one test application associated with an XML tag structure, e.g., the XML tag structure of FIG. 3, in accordance with an embodiment of the present invention.

FIG. 6 is a diagrammatic representation of an XML schema definition with an XML tag structure, e.g., the XML tag structure of FIG. 5, that is associated with a SQL test type in accordance with an embodiment of the present invention.

DETAILED DESCRIPTION OF THE EMBODIMENTS

In the description that follows, the present invention will be described in reference to embodiments that test subsystems on a platform for a software application, such as a database application. However, embodiments of the invention are not limited to any particular architecture, environment, application, or implementation. For example, although embodiments will be described in reference to database applications, the invention may be advantageously applied to any software application. Therefore, the description of the embodiments that follows is for purposes of illustration and not limitation.

A framework which enables application programming interface (API) testing to occur without requiring that a specific API test be written for each test case enables testing of API application code to occur efficiently. Such a framework may allow for relatively efficient development of API tests by effectively allowing functionality associated with different API tests to be shared and reused. Such a framework allows an API to be tested without requiring that significant amount of software be written, and further enables multiple API tests to be chained together, an API may be comprehensively tested in an efficient manner. Hence, the reliability of an API may be enhanced as developers may be more willing, as well as able, to more fully test an API since the need to write a significant amount of software code is effectively eliminated.

Figure 1:
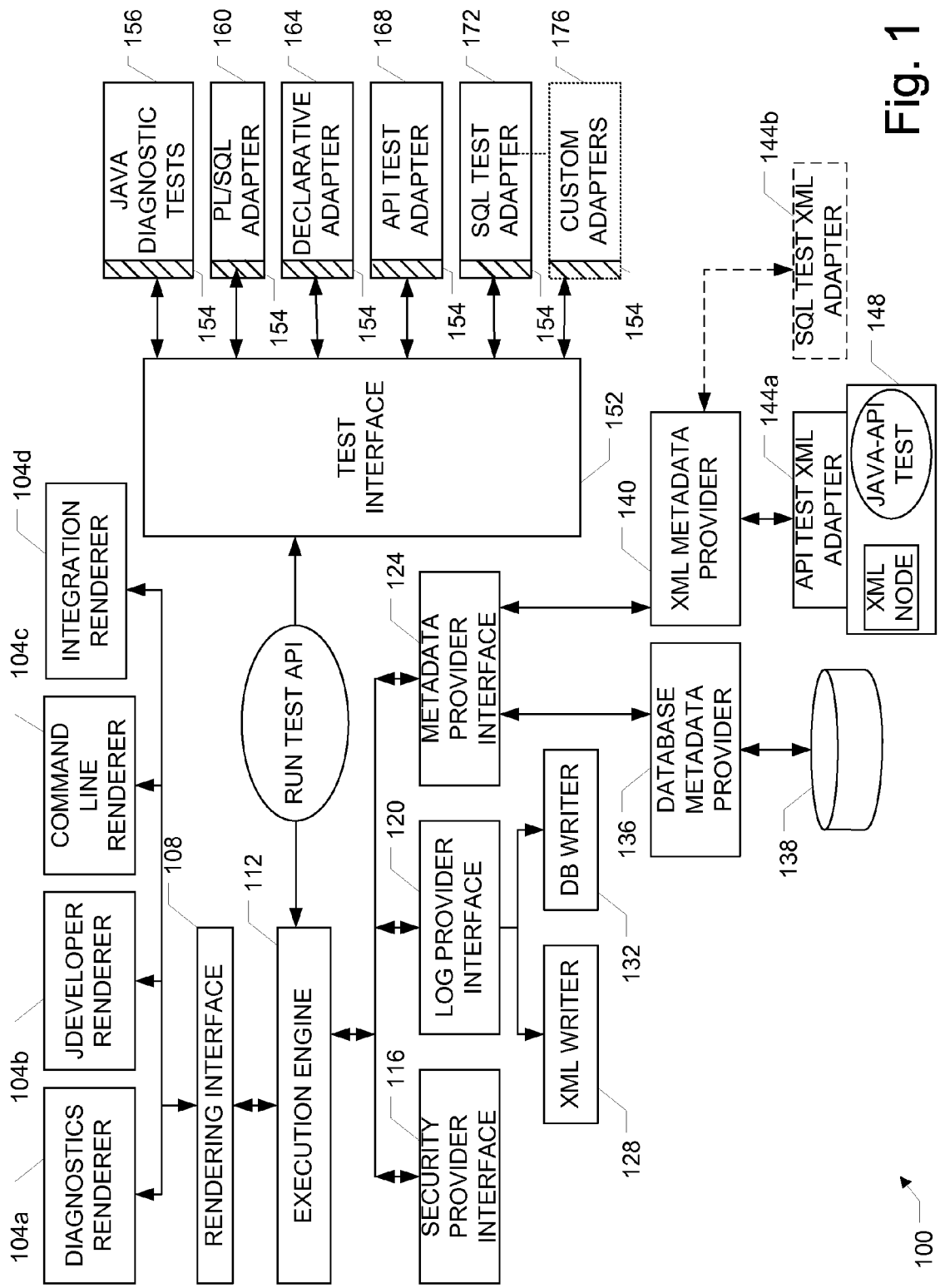
FIG. 1 is a block diagram representation of an architecture which includes a diagnostics and application programming interface (API) testing framework in accordance with an embodiment of the present invention.

FIG. 1 is a diagrammatic representation of an implementation architecture of a diagnostics and API testing framework in accordance with an embodiment of the present invention. An architecture 100, which may be part of a computing system which includes processors and storage devices on which code devices associated with the architecture are stored, is arranged to provide a diagnostics and testing framework, e.g., an API testing framework. Within architecture 100, repositories 138, 148 are arranged to store data, e.g., repository 148 is arranged to store information pertaining to an API test. Repository 138, which may be a database that stores tables, is arranged to be accessed by a database metadata provider. Similarly, repository 148, which is arranged to store XML files is arranged to be accessed by an XML metadata provider 140 through an API test XML adapter 144a. It should be appreciated that although XML files are discussed, the files stored for use in the implementation architecture may generally be substantially any files written using declarative metadata.

Database metadata provider 136 and XML metadata provider 140 are source specific providers that are arranged to transform data into a format that may be understood by a execution engine or layer 112. While only database metadata provider 136 and XML metadata provider 140 are shown, any number of providers may generally be included that interface with execution engine 112 via a metadata provider interface 124. Metadata provider interface 124 is generally arranged such that providers such as database metadata provider 136 and XML metadata provider 140 may communicate with execution engine 112.

API test XML adapter 144a is arranged to enable custom tags of an XML schema definition, which will be described below with reference to FIGS. 5 and 6, to be read and written. In general, API test XML adapter 144a is an interface that is arranged to persist XML data. API test XML adapter 144a may marshal XML test data into a custom test object, e.g., a custom Java test object, at run-time that may effectively be executed by execution engine 112. It should be understood that other types of text XML adapters, as for example a SQL test XML adapter 144b, may be provided to interface with XML metadata provider 140 to enable custom tags of an XML schema definition associated with a SQL test to be read and written. XML metadata provider 140 is generally arranged to identify an appropriate test XML adapter or test type adapter for a test to be executed.

When execution engine 112 runs tests such as an API test, execution engine 112 accesses a security provider interface 116 which provides a security model that is used to enforce authorization rules which control access to a test and to test results. That is, security provider interface 116 is arranged to enforce security in terms of who may run a test and who may view the output of a test. In one embodiment, security provider interface 116 delegates a call to a security provider (not shown).

Execution engine 112 also logs information, e.g., the output of tests, for reporting purposes using a log provider interface 120. Log provider interface 120 is effectively a reporting storage interface. Repositories such as an XML writer 128 and a database writer 132 which are interfaced with execution engine 112 through log provider interface 120 are arranged to store reports which are persisted in log files. XML writer 128 may be used for the storage of reports associated with XML metadata, while database writer 132 may be used for the storage of reports associated with database metadata.

In general, execution engine 112 includes the core execution logic associated with architecture 100, and delegates calls or logic to appropriate sources. Execution engine 112 may take user commands and cause a test to be run and registered, and also cause test results or output to be displayed as appropriate. For example, when an API test is to be run, execution engine 112 calls into a test interface 152 which effectively provides handshaking between execution engine 112 and adapters such as API test adapter 168, SQL test adapter 172, and any custom adapters 176.

For each test type, an adapter which is arranged to run the test type is effectively interfaced with test interface 152. By way of example, API test adapter 168 is arranged to include the logic that is needed in order to understand a test definition provided in an XML file. API test adapter 168 is arranged to instantiate the method identified in the XML file, and to provide the results of the instantiation to execution engine 112. In general, adapters such as API test adapter 168 transform declarative metadata into objects that implement test interface 152. At runtime, when execution engine 112 runs a test, an object that implements test interface 152 invokes desired APIs on a desired entity with prescribed input parameters, and also captures output parameters and performs comparisons to determine the success or the failure of the test.

In general, an adapter such as API test adapter 168 is a program which has the ability to transform data, e.g., declarative metadata, from one format into another such that the data may be understood by execution engine 112. API test adapter 168, for example, transforms test metadata into a format that is understood by execution engine 112.

Java diagnostic tests 156 which contain runtime information, a PL/SQL adapter 160, a declarative adapter 164, API test adapter 168, SQL test adapter 172, and any custom adapters 176 are all arranged to interface with execution engine 112 via test interface 152. Such elements effectively rewrite data into a language or format that is understood by test interface 152. Each of the elements which are effectively plugged into test interface 152 include a generic adapter portion or a common layer 154. Specifically, each element plugged into test interface 152 essentially extends the functionality or logic associated with generic adapter portion 154. In one embodiment, while generic adapter portion 154 effectively handles common tags associated with a declarative metadata file, the extensions associated with each element, e.g., the extensions off of generic adapter portion 154 associated with API test adapter 168, handle custom or unique tags within the declarative metadata file. It should be appreciated that API test adapter 168 may include the capabilities associated with API test XML adapter 144a. That is, API test adapter 168 may be arranged to persist XML data and to read and write custom tags, in addition to being arranged to provide a running test logic interface.

Extensibility enables custom adapters 176 to be written as needed, and then plugged into architecture 100 when additional functionality within architecture 100 is desired. Extensibility further enables such custom adapters 176 to utilize and build off of generic adapter portion 154.

A rendering interface 108, e.g., a user interface rendering interface, is in communication with execution engine 112, and enables information pertaining to tests to be displayed to a user. User interface rendering interface 108 may be JSP fronted for web-based user interfaces, for example, and generally provides an abstraction away from what a user interface is expected to look like. It should be appreciated that JSP is just one example of a suitable user interface technology. There may be several different user interfaces that may be used to present diagnostics data to a user. In general, user interfaces and commandline user interfaces may be in communication with user interface rendering interface 108 through renderers 104. For each available user interface, an associated user interface renderer 104 that implements method or routines prescribed by user interface rendering interface 108 typically exists. That is, diagnostic user interface renderers 104 implement user interface rendering interface 108. Such user interface renderers 104 may include, but are not limited to, a diagnostics renderer 104a, a Jdeveloper renderer 104b, a command line or text renderer 104c, and an integration renderer 104d, which may effectively be used to record a test when an application such as Winrunner is interfaced with integration renderer 104d. Winrunner 104d is available commercially from Mercury Interactive of Mountain View, Calif. In order for communication to be achieved with a user interface layer (not shown), execution engine 112 invokes the methods of a suitable user interface renderer 104 that is associated with a specified user interface.

FIG. 2 is a representation of an XML schema definition or test script of an API test in accordance with an embodiment of the present invention. An XML schema definition 600 includes an API test type tag 604 that specifies an API to test. While the API to test may be substantially any suitable API, the API is shown as being an account creation API. Input parameters tag 608 which is specified in XML schema definition 600 is arranged to include, but is not limited to including, a first name of a potential account holder 628*a*, a last name of the potential account holder 628*b*, and a date of birth of the potential account holder 628*c*. Output parameters tag 612 generally includes an account number for a newly created account. A new account number 632 may be stored such that XML schemas for other API tests may access new account number 632, i.e., new account number 632 may be pipelined. The pipelining of data will be discussed below with reference to FIGS. 9*a* and 9*b*. An error condition tag 616 is specified for a normal error, and includes error message and fix information 620. In the embodiment as shown, XML schema definition 600 also includes a description tag 636 which is used to indicate what the API specified in entity to test 604 is arranged to do.

Some API tests which are specified within XML schema definitions or, more generally, declarative metadata, such as XML schema definition 600 of FIG. 2 may be a part of a test suite. A test suite is generally an overall test application which includes a plurality of API tests. Referring next to FIG. 3, an XML tag structure which is used within an overall test application will be described in accordance with an embodiment of the present invention. An XML tag structure for a test application 700 includes a test suite tag 702 which may identify a name of the test suite, and provide some information pertaining to the test suite. Test suite 702 generally contains a plurality of tests that test a particular piece of functionality. Since a test suite typically includes a group of tests, e.g., a logical group of tests, test type tags such as test type tag 706 are effectively a component of test suite 702. As shown, test type tag 706 may be an API test type tag. An API test type tag is converted by a QA test interface object by an API test type adapter. In general, a QA test interface object is used by an execution layer for running the test specified by the API test type tag.

It should be appreciated that a test suite may generally contain a plurality of test type tags 706 which may include test type tags other than an API test type tag. Another suitable test type tag is a SQL test type tag, which will be described below with reference to FIG. 5. Different test types may generally exist within a test suite.

In one embodiment, a test application represents an overall product that is being tested, and may include one or more test suites. Substantially all test suites or, more generally, tests specified in a test application are pertinent to the overall product that is being tested. While any number of attributes may be specified with a test application, a test application is typically specified with at least a short name for the test application, a full name for the test application, and a file version of the test application.

A service bean information tag 710, which may be specified under API test type tag 706, is arranged to contain information relating to a service name and configuration information. Also specified under API test type tag 706 are an input parameters tag 714, an output parameters tag 722, a description tag 730, an error information tag 734, and an output exception tag 738. Input parameters tag 714 is arranged to encapsulate any number of input parameter tags 718. Similarly, output parameters tag 722 is arranged to encapsulate any number of output parameter tags 726.

FIG. 4 is a representation of one test application in accordance with an embodiment of the present invention. A test application 800 may be specified with a name and an identifier that uniquely identifies test application 800. A test suite 802, which may be considered to be a first level of hierarchy within test application 800, includes a component identifier which indicates a group of tests being run within test application 800. Included in test suite 802 are any number of test types 806*a-d* which, in the embodiment as shown, are API tests types which are specified with a language, an identifier, a method name, and a class. As previously mentioned, while test types 806*a-d* are shown as all being API test types, test types 806*a-d* may include substantially any suitable test type, e.g., a SQL test type.

Each test type 806*a-d*, e.g., test type 806*c* which is an API test type, is specified with additional information. The additional information typically includes input parameters 814, where each input parameter 818 is specified within input parameters 814. Similarly, the additional information specified in test types such as test type 806*c* also includes output parameters 822, where each output parameter 826 is specified within output parameters 822. Error information 834 is also typically specified within test types with a type. An error message and error fix information are also included within error information 834. In the described embodiment, test type 806*c* further includes a description 830 which describes test type 806*c*.

As previously mentioned, a test suite may include test type tags other than, or in addition to, an API test type tag. By way of example, a test suite may include a SQL test type tag. A SQL test type and an API test type may have tags in common, as well as tags which are not in common. When an API test type adapter and a SQL test type adapter, e.g., API test type adapter 168 and SQL test type adapter 172 of FIG. 1, are created, each test type adapter includes generic tags. Further, an API test type adapter and a SQL test type adapter may each includes custom tags. However, test adapters are not limited by the interpretation of common tags defined by the generic adapter. Being extensions of the generic adapter, test adapters may extend or override the functionality of the generic adapter.

Figure 5:
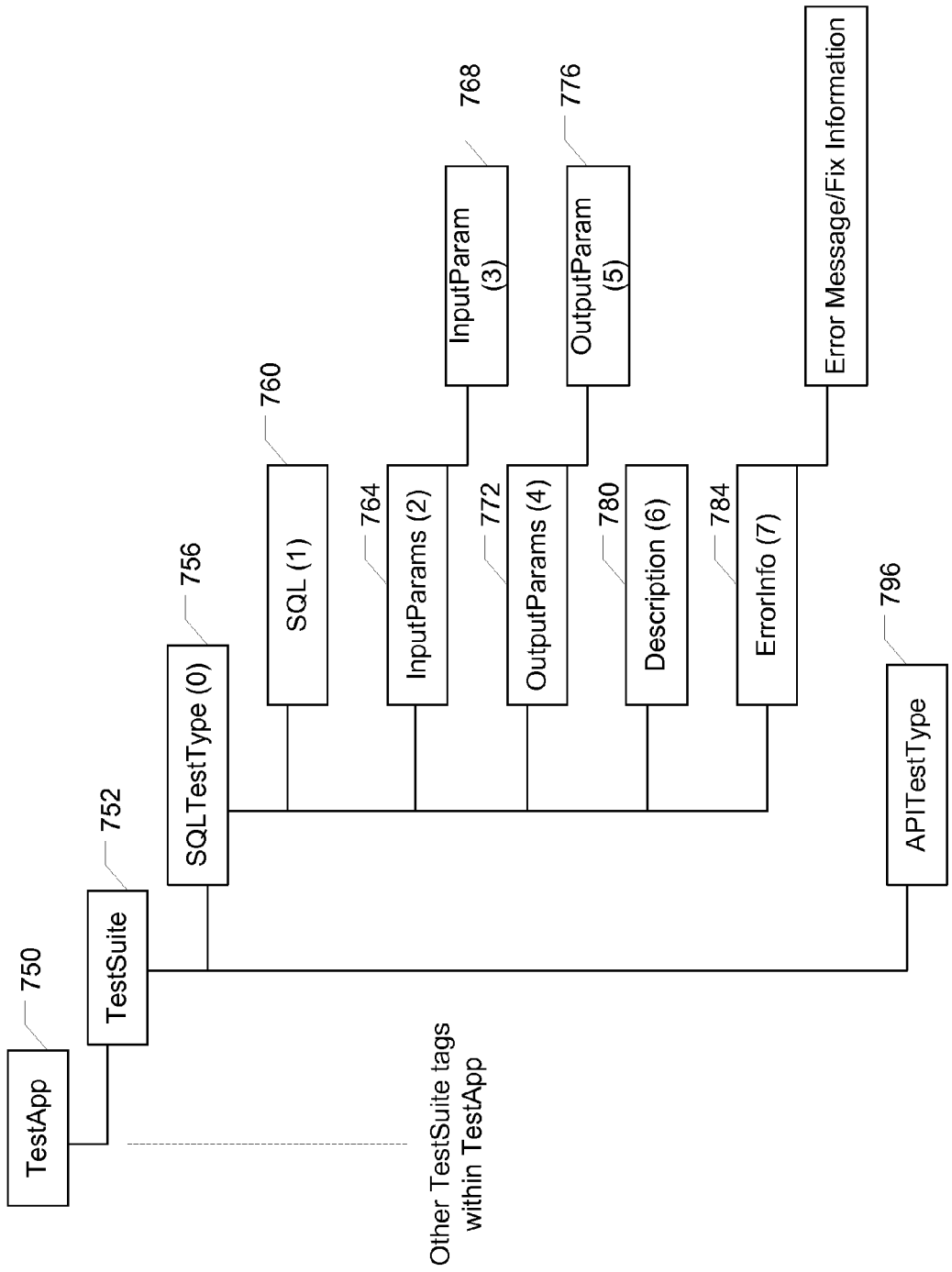
FIG. 5 is a diagrammatic representation of a second XML tag structure which is used within an overall test application in accordance with an embodiment of the present invention.

FIG. 5 is a representation of a test application which includes a test suite which may be used to test both an API test type and a SQL test type in accordance with an embodiment of the present invention. An XML tag structure for a test application 750 includes a test suite tag 752 which may identify a name of the test suite. Test suite 752 generally contains a plurality of tests identified by test type tags 756, 796. Test type tag 756 is associated with a SQL test type, while test type tag 796 is associated with an API test type. Tags associated with an API test type tag such as test type tag 796 were previously discussed with respect to FIG. 3.

A SQL test type which is identified by a SQL test type tag 756 which is generally converted to a QA test interface object by a SQL test type adapter. A SQL tag 760, which may be specified under SQL test type tag 756, is arranged to contain a block of SQL that is to be executed. An input parameters tag 764, an output parameters tag 772, a description tag 780, and an error information tag 784 are also specified under SQL test type tag 756, and are effectively "generic" or base tags which are specified for each test type associated with declarative metadata such as XML metadata. In other words, input parameters tag 764, output parameters tag 772, description tag 780, and error information tag 784 are common tags associated with a generic adapter portion, e.g., generic adapter portion 154 of FIG. 1, that is associated with a variety of test types such as an API test type and a SQL test type.

Input parameters tag 764 is arranged to encapsulate at least one input parameter tag 768 that that is bound to SQL tag 760. Similarly, output parameters tag 772 is arranged to encapsulate at least one output parameter tag 776 that is bound to SQL tag 760. Description tag 780 is arranged to describe what a test, i.e., the test specified by SQL test type tag 756, does, while error information tag 784 is arranged to identify an error message and fix information that is displayed to a user in the event that a test fails.

FIG. 6 is a diagrammatic representation of an XML schema associated with a SQL test type in accordance with an embodiment of the present invention. An XML schema for a SQL test type, as specified by a SQL test type tag 856, includes tags which are generally common to all tests types associated with an implementation architecture, e.g., implementation architecture 100 of FIG. 1. The common tags are, as discussed above, a description tag 880, an error information tag 884, an input parameters tag 864, and an output parameters tag 872. An input parameter tag 868 and an output parameter tag 876, which are specified with input parameters tag 864 and output parameters tag 872, respectively, may also be considered to be standard tags. As shown, description tag 880 is used to provide a description of the SQL test type specified using SQL test type tag 856, while error information tag 884 describes an error and provides information which may be used to fix the error. A SQL tag 862 is a custom tag that is associated with a SQL test type. SQL tag 862 is arranged to contain SQL code that is to be executed.

As previously mentioned, each test adapter has an associated set of tags which may be used in a schema, e.g., a schema written in an extensible markup language such as XML, that allows API testing to be performed. The set of tags for a test adapter includes tags associated with a generic adapter. That is, among the tags which are understood by a test adapter are common tags which are effectively defined by a generic adapter that is extended by the test adapter to include tags that are understood substantially only by that test adapter. The generic adapter is effectively encompassed by any test adapters associated with the framework discussed above with respect to FIG. 1.

Each test adapter is generally associated with functionality that enables any custom tags associated with each test adapter to be read from and written into a suitable repository, e.g., an XML metadata provider. That is, in addition to including a test logic interface, each test adapter has an associated interface which enables data, e.g., XML data, associated with custom tags to be persisted. The functionality that enables data associated with custom tags to be persisted may either be implemented separately from a corresponding test adapter, or as part of an overall test adapter. In other words, the functionality to marshal and to unmarshal data from a suitable repository may be implemented as part of an overall test adapter, or substantially separately from the overall test adapter, though the functionality is used by the overall test adapter. The implementation of functionality that enables data associated with custom tags to be implemented separately will be described below with respect to FIG. 7, while the functionality that enables data associated with custom tags to be implemented as a part of an overall test adapter will be described below with respect to FIG. 8.

Figure 7:
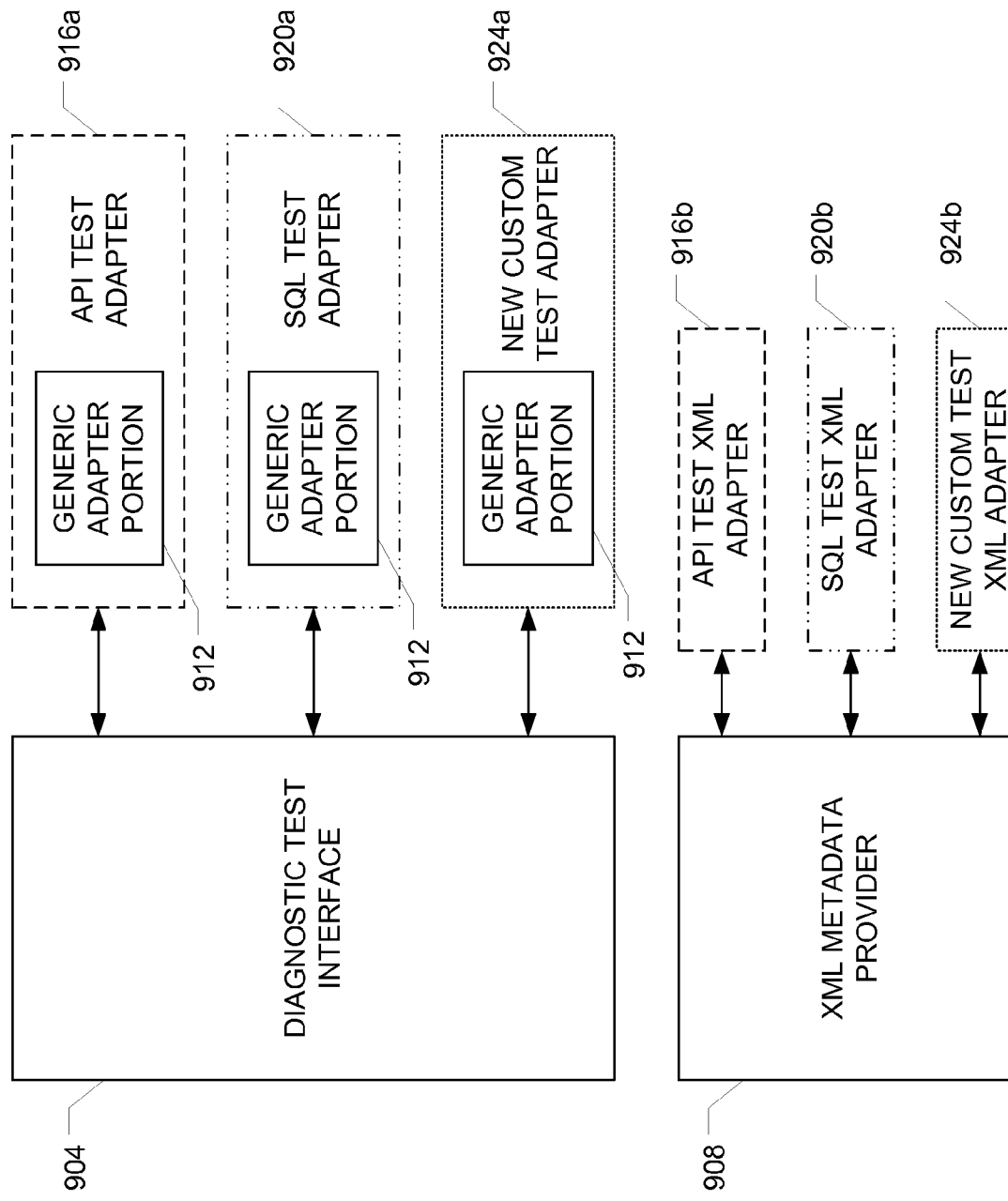
FIG. 7 is a diagrammatic representation of test adapters and test XML adapters, or adapters with functionality to persist XML data, which are substantially separate in accordance with an embodiment of the present invention.

With reference to FIG. 7, test adapters and test XML adapters, or adapters with functionality to persist XML data, will be described in accordance with an embodiment of the present invention. As previously mentioned, a test adapter is essentially a translator which may be used to allow a diagnostics execution engine to execute a test schema or test script obtained from a repository. A test XML adapter allows a test to be written into or read from a suitable repository. An overall adapter class is associated with test adapters, or adapters which include test logic interfaces, and test XML adapters, or adapters which enable XML data to be persisted in a repository. An API test adapter 916*a*, which is of an overall API adapter class, is arranged to effectively include a generic adapter portion 912, and to interface with a diagnostic test interface 904. API test adapter 916*a* includes an API test logic interface that is used by diagnostic test interface 904 to cause an API test obtained from a metadata provider 908 to be run. An API test XML adapter 916*b*, which is also part of the API adapter class, is used by metadata provider 908 to marshal and to unmarshal specialized tags associated with a schema or a test definition of the API adapter class. As shown, API test adapter 916*a* and API test XML adapter 916*b* may be implemented as two substantially separate adapters.

A SQL test adapter 920*a*, which is of an overall SQL adapter class, also includes generic adapter portion 912 and interfaces with diagnostic test interface 904. A SQL test adapter 920*b* that is associated with SQL test adapter 920*a* is used by metadata provider 908 to marshal and to unmarshal specialized tags associated with the SQL adapter class.

When a new adapter class is created, any new custom test adapter 924*a* that is associated with the new adapter class includes generic adapter portion 912, and is arranged to communicate with diagnostic test interface 904. A new custom test XML adapter 924*b* associated with the new adapter class is arranged to interface with metadata provider 908, and is an interface which allows any custom tags associated with the new adapter class to be read and written into a repository.

Figure 8:
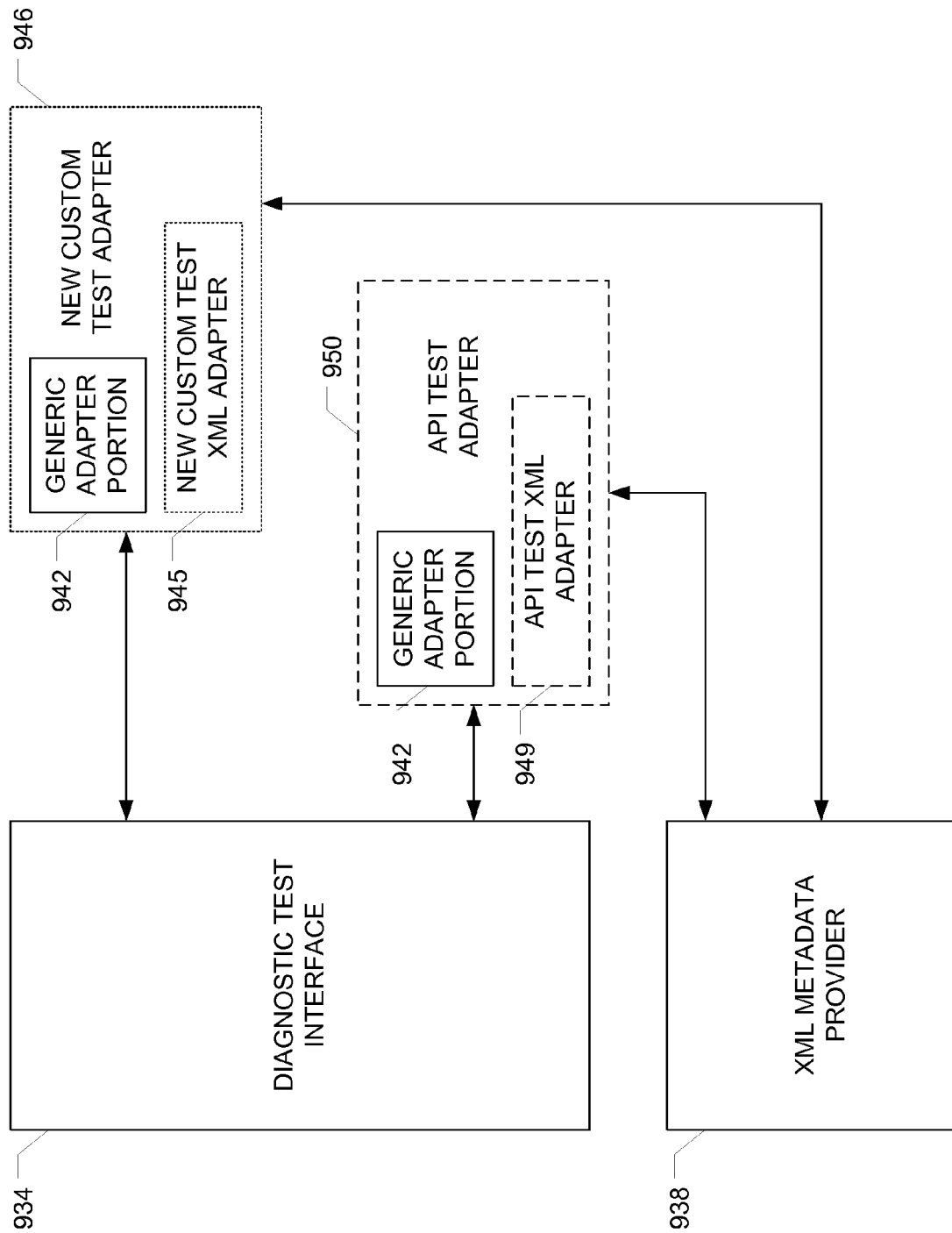
FIG. 8 is a diagrammatic representation of test adapters which substantially encompass test XML adapters in accordance with an embodiment of the present invention.

As mentioned above, an adapter class may either allow a test adapter and a test XML adapter to be created as two substantially separate adapters, or an adapter class may allow a test adapter to be created that includes the functionality and the interfaces which are generally associated with a test XML adapter. Referring next to FIG. 8, the use of a single adapter for an adapter class to encompass the functionality of a test adapter and the functionality of a test XML adapter will be described in accordance with an embodiment of the present invention. An API test adapter 950, which is effectively instantiated form an API test adapter class, includes a generic adapter portion 942 which is associated with common tags that are generally common to all test adapters within an overall framework. API test adapter 950, in addition to being arranged to include a test logic interface, also includes the interface which enables specialized tags associated with an API test adapter class to be read from and written into a metadata provider 938. Hence, API test adapter 950 is in communication with both diagnostic test interface 934 and with metadata provider 938.

A new custom test adapter 946 created for a new test adapter class includes, in addition to generic adapter portion 942, new custom test XML adapter 945. Like API test adapter 950, new custom test adapter 946 is in communication with both diagnostic test interface 934 and with metadata provider 938. For ease of illustration, a SQL test adapter has not been shown, though a SQL test adapter may also include both a generic adapter portion and a SQL test XML adapter.

Figure 9:
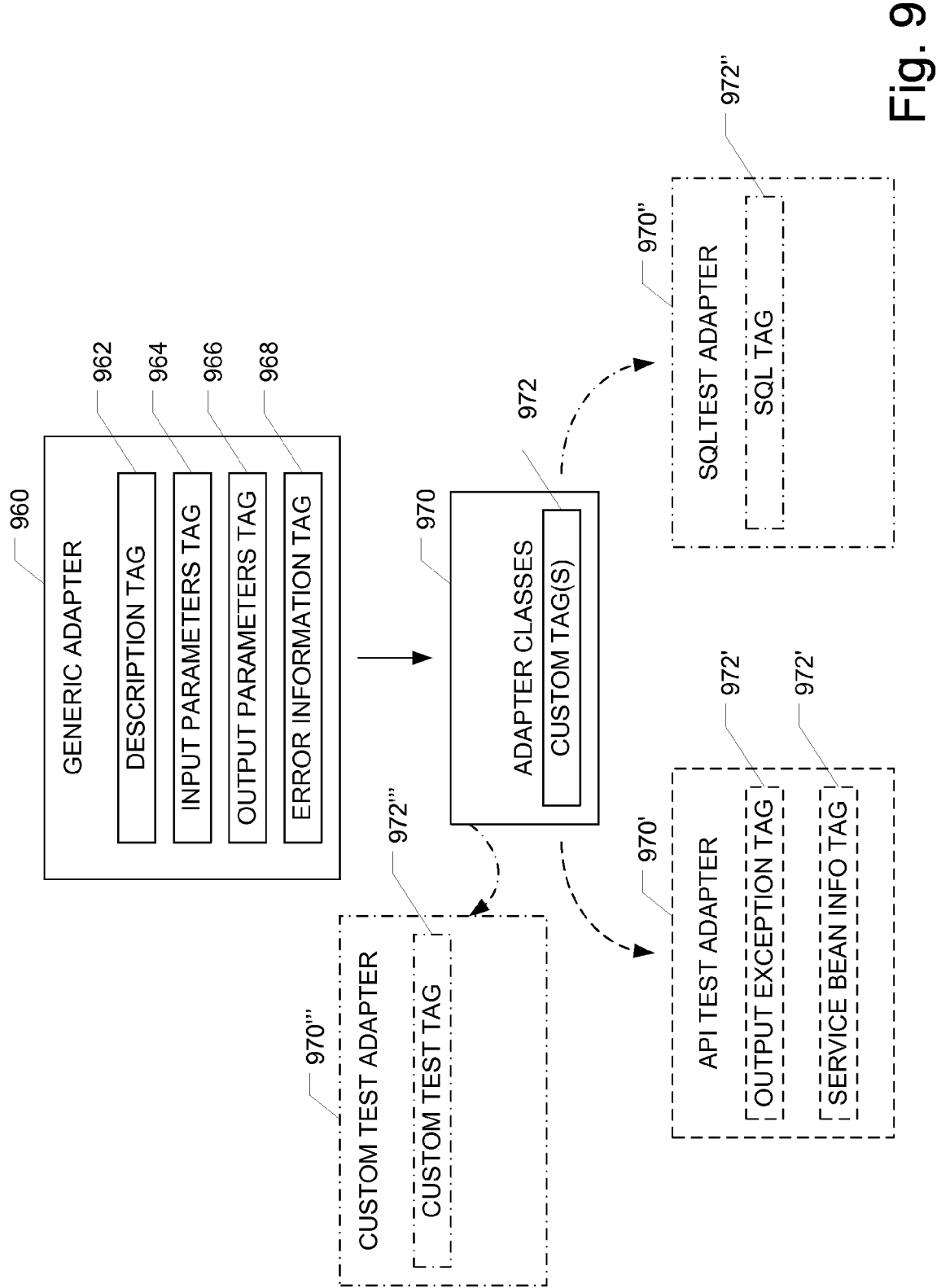
FIG. 9 is a block diagram representation of a generic adapter and test adapter classes which extend the functionality of the generic adapter in accordance with an embodiment of the present invention.

A generic test adapter, as described above, is arranged to effectively include or utilize tags which are common to substantially all test adapter classes which effectively extend the functionality of the generic test adapter. Extending the functionality of the generic test adapter generally includes creating and utilizing custom tags which are associated with different test adapter classes. FIG. 9 is a block diagram representation of a generic adapter and test adapter classes which extend the functionality of the generic adapter in accordance with an embodiment of the present invention. A generic adapter 960 has an associated set of generic or common tags which include, but are not limited to, a description tag 962, an input parameters tag 964, an output parameters tag 966, and an error information tag 968. Such tags, as well as substantially all functionality associated with generic adapter 960, may be incorporated into adapter classes 970 which provide extended functionality. That is, adapter classes 970 extend generic adapter 960. Adapter classes 970 often include custom tags 972.

An API test adapter 970' that is instantiated from an adapter class 970 may include amongst other tags inbound parameters, outbound parameters, an output exception tag 972', and a service bean information tag 972'. A SQL test adapter 970" that is instantiated from an adapter class 970 includes a SQL tag 972". In general, a custom test adapter 970'" which effectively extends the functionality of generic adapter 960 includes at least one custom test tag 972'", and may be created when a new type of test is to be executed using an overall framework which allows for custom test adapters. It should be appreciated that custom test adapter 970'" may not necessarily include a custom test tag and may, instead, substantially only utilize the tags associated with generic adapter 960.

Typically, an object, e.g., a Java object, is created by an adapter class after a document obtained from a repository is substantially analyzed, as previously mentioned. Such an object may be a test interface object or, more specifically, when the document is an XML document, such an object may be a QA test interface object that is used in the execution of a test involving the XML document. In one embodiment, a QA test information object may be considered to be an in-memory representation of XML metadata that is stored in an XML metadata provider.

Figure 10:
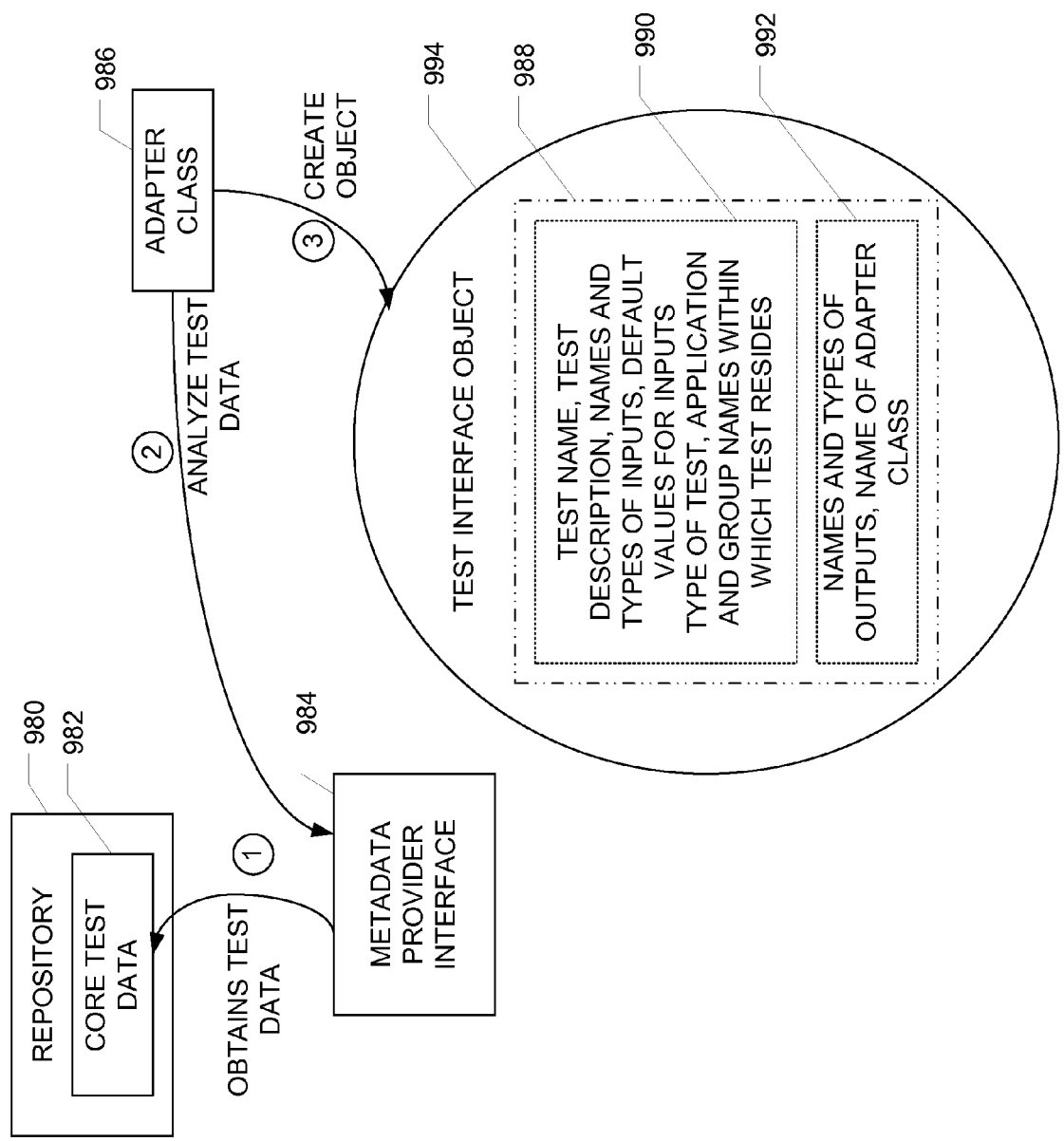
FIG. 10 is a diagrammatic representation of a process of creating a test interface object in accordance with an embodiment of the present invention.

FIG. 10 is a diagrammatic representation of a process of creating a test interface object in accordance with an embodiment of the present invention. When a metadata provider interface 984 obtains core test data 982, e.g., a test schema or test document, from a repository 980, an adapter class 986 or an instance of adapter class 986 effectively analyzes core test data 982. Upon analyzing core test data 982, adapter class 986 instantiates or creates a test interface object 994. In one embodiment, for XML test data, a data structure such as a hash table of name value pairs may be created in addition to test interface object 994 to facilitate any reconstruction of the XML test data. The creation of such a data structure may enable users to create tests using a user interface which may be needed to insert data into an XML data repository for playback at a later time.

Test interface object 994 includes information 988 which typically includes information 990 that is common to substantially all tests and information 992 that is relatively specific to the type of metadata associated with the tests. By way of example, when repository 980 is an XML metadata provider, test interface object 994 contains information 992 specific to XML metadata. Alternatively, when repository 980 is a database metadata provider, test interface object 994 contains information specific to database metadata. Test interface object 994, as shown, is a QA test interface object that is associated with core test data 982 that is XML metadata.

Within test interface object 994, standard information 990 may include, but is not limited to, a test name, a test description, names and types of inputs, default values for the inputs, a type associated with the test, and application and group names within which the test resides. A type associated with a test, in the described embodiment, may be a Java type, a PLSQL type, a declarative type, a Java unit type, and a PLSQL unit type. When repository 980 is a XML metadata repository, test-specific information 992 may include names and types of outputs and a name of adapter class 986.

Although only a few embodiments of the present invention have been described, it should be understood that the present invention may be embodied in many other specific forms without departing from the spirit or the scope of the present invention. By way of example, while Java has generally been described as an API test type language, substantially any test type language may be used. Suitable test type languages may include, but are not limited to, PL/SQL.

A system with an API test adapter has been described as also including a SQL test adapter and other custom test adapters. It should be appreciated that a system which includes an API test adapter may not necessarily also include a SQL test adapter or other custom test adapters. Conversely, a SQL test adapter or other custom adapters may be included in a system that does not include an API test adapter.

While declarative metadata has been described as being XML metadata, it should be appreciated that declarative metadata is not limited to being XML metadata. Other suitable types of declarative metadata may be used to create a schema that utilizes common and custom tags.

In general, the steps associated with methods of the present invention may vary widely. Steps may be added, removed, altered, and reordered without departing from the spirit or the scope of the present invention. Therefore, the present examples are to be considered as illustrative and not restrictive, and the invention is not to be limited to the details given herein, but may be modified within the scope of the appended claims.

What is claimed is:

1. A framework residing on a computer suitable for use to test an application programming interface (API), the framework comprising:
    a metadata provider arrangement, the metadata provider arrangement being arranged to store a first declarative metadata in a first format in a memory of the computer;
    a metadata provider interface arranged to obtain the first declarative metadata associated with a first test of the API from the declarative metadata provider;
    a first test adapter, the first test adapter being arranged to include logic used to transform the first declarative metadata from the first format to a second format, wherein the second format is different from the first format;
    a diagnostic test interface, the diagnostic test interface being arranged to cooperate with the first test adapter to execute the first test, wherein the first test adapter is effectively interfaced with the diagnostic test interface;
    a diagnostics execution engine, the diagnostics execution engine being arranged to communicate with the diagnostic test interface to cause the first test to be executed using the first declarative metadata in the second format; and
    a specification of a pipelined datum, the pipelined datum being arranged to be accessed by the first test as well as a second test, wherein the pipelined datum is one of an input to be read by the second test from an in-memory data structure and an output to be written by the first test into the in-memory data structure.

2. The framework of claim 1 further comprising:
    a second test adapter, the second test adapter being interfaced with the diagnostic test interface and including logic to transform a second declarative metadata in a third format to a fourth format, wherein the fourth format is different from the third format, and the diagnostics execution engine further causes the first test of the API to be executed using the second declarative metadata in the fourth format.

3. The framework of claim 2 wherein the first test adapter and the second test adapter each include a generic adapter portion, and the first test adapter provides a first extension to the generic adapter portion and the second test adapter provides a second extension to the generic adapter portion, wherein each generic adapter portion of the first and second test adapter is capable of transforming a third declarative metadata in a fifth format to a sixth format, and the fifth format is different from the first and third formats.

4. The framework of claim 1 further comprising:

a security provider interface, the security provider interface being arranged to communicate with the diagnostics execution engine to enforce authorization rules which control access to test results.

5. The framework of claim 3 wherein at least two tags for the generic adapter portions include a description tag and at least one of an input parameters tag, output parameters tag, and an error information tag.

6. The framework of claim 3 wherein the first extension defines at least one tag which is not defined by the generic adapter portion.

7. The framework of claim 3 wherein the first test adapter is an API test adapter and the second test adapter is a SQL test adapter.

8. The framework of claim 1 wherein the metadata provider arrangement is arranged to communicate with a test declarative metadata adapter to read and to write the declarative metadata into a repository, the test declarative metadata adapter being associated with the first test adapter.

9. The framework of claim 8 wherein the test declarative metadata adapter and the first test adapter are associated with an adapter class.

10. The framework of claim 8 wherein the test declarative metadata adapter and the first test adapter are a part of an overall adapter.

11. The framework of claim 1 wherein the declarative metadata is XML metadata and the first test adapter is an API test adapter.

12. A computer-implemented method for processing test data, the test data including declarative metadata, within a testing framework, the testing framework having a plurality of adapters including a first adapter arranged to handle the test data, wherein the first adapter has a generic adapter portion and a specialized adapter portion, the generic adapter portion being encompassed in each of the plurality of adapters, the method comprising:

analyzing the test data in preparation for creating a test interface object;

creating a test interface object based on the analysis of the test data, the test interface object being arranged to substantially store the test data as at least a first set of information and a second set of information, wherein the first set of information is substantially associated with declarative metadata and the second set of information is substantially associated with metadata; and using the test interface object to test an application programming interfaces, wherein the using the test interface object to test an application programming interface comprises:

with a test application, executing a first test on a first entity using the test interface object and the first adapter, wherein the test application is further arranged to specify at least a second entity to be tested and executing the test application causes a first output associated with testing the first entity to be stored in an in-memory data structure and causes the first output associated with testing the first entity to be obtained from the in-memory data structure as a first input associated with testing the second entity.

13. The method of claim 12 wherein the second set of information includes at least one of a name of a test, a test description, and input parameter information.

14. The method of claim 12 wherein the first set of information includes at least one of output parameter information and information associated with an adapter class associated with the first adapter.

15. The method of claim 12 wherein a provider interface of the testing framework obtains the test data from a repository.

16. The method of claim 12 further comprising:

executing a second test associated with the test data using the test interface object, wherein an execution layer of the testing framework causes the second test to be executed.

17. The method of claim 12 wherein creating the test interface object further includes storing the test interface object in a memory associated with the testing framework.

18. A computer-implemented method for running an application programming interface (API) test comprising:

obtaining test data, the test data including declarative metadata, the test data being obtained using a test declarative metadata adapter of a first class;

providing the test data to a diagnostic test interface; and executing a test associated with the test data using the diagnostic test interface, wherein executing the test associated with the test data using the diagnostic test interface comprises:

calling a first test adapter of the first class to obtain testing logic for executing the test associated with the test data, the first test adapter being in communication with the diagnostic test interface, the first test adapter being arranged to include a generic test adapter portion, wherein the first test adapter is capable of transforming metadata from a first format to a second format, the second format is different from the first format, the generic test adapter portion defines at least one tag that is common to a plurality of test adapters of the first class, and a test adapter portion that defines at least one tag that is not common to the plurality of test adapters of the first class; and with a test application, executing the test on a first entity using the first test adapter, wherein the test application is further arranged to specify at least a second entity to be tested and executing the test application causes a first output associated with testing the first entity to be stored in an in-memory data structure and causes the first output associated with testing the first entity to be obtained from the in-memory data structure as a first input associated with testing the second entity.

19. The method of claim 18 wherein the test data is obtained from a repository.

20. The method of claim 19 wherein the test declarative metadata adapter and the first test adapter are a part of an overall test adapter which is in communication with the diagnostic test interface and with the repository.

21. The method of claim 18 wherein the test data is an XML schema.

22. A framework residing on a computer suitable for use to test an application programming interface (API), the framework comprising:
- a metadata provider arrangement, the metadata provider arrangement being arranged to store declarative metadata associated with a first test in a memory of the computer;
- a test declarative metadata adapter arrangement, the test declarative metadata adapter arrangement being arranged to marshal and to unmarshal the declarative metadata associated with the first test from the metadata provider arrangement;
- a first test adapter arrangement, the first test adapter arrangement being arranged to include logic used to process the declarative metadata associated with the first test to convert the declarative metadata from a first format to a second format, different from the first format, wherein the first test adapter arrangement and the test declarative metadata adapter arrangement are a part of an adapter class;
- a diagnostic test interface, the diagnostic test interface being arranged to cooperate with the first test adapter arrangement to execute the first test, wherein the first test adapter arrangement is effectively interfaced with the diagnostic test interface; and
- a specification of a pipelined datum, the pipelined datum being arranged to be accessed by the first test as well as a second test, wherein the pipelined datum is one of an input to be read by the second test from an in-memory data structure and an output to be written by the first test into the in-memory data structure.

23. The framework of claim 22 further comprising:
- a diagnostics execution engine, the diagnostics execution being arranged to communicate with the diagnostic test interface to cause the first test to be executed.

24. The framework of claim 23 further comprising:
- a second test adapter arrangement, the second test adapter arrangement being interfaced with the diagnostic test interface.

25. The framework of claim 24 wherein the first test adapter arrangement and the second test adapter arrangement each include a generic adapter portion, and the first test adapter arrangement provides a first extension to the generic adapter portion and the second test adapter arrangement provides a second extension to the generic adapter portion.

26. The framework of claim 25 wherein the generic adapter portion is arranged to define at least one declarative metadata tag that is common to the first test adapter arrangement and the second test adapter arrangement.

27. The framework of claim 23 wherein the test declarative metadata adapter arrangement and the first test adapter arrangement are incorporated in a single adapter.

28. The framework of claim 23 wherein the declarative metadata is XML metadata.

29. The framework of claim 23 wherein the first test adapter arrangement is one of an API test adapter and a SQL test adapter.

30. A computer-implemented method for extending functionality associated with a testing framework, the testing framework being suitable for use in testing application programming interfaces (APIs), the testing framework including a repository arranged to store metadata, a diagnostics execution engine, a diagnostic test interface, and an API test adapter, the API test adapter including a first portion with a first set of declarative metadata tags and a second portion that is arranged to extend the first portion, the API test adapter being in communication with the diagnostic test interface, the method comprising:
- creating a first test adapter, the first test adapter being arranged to perform a first type of test, wherein creating the first test adapter includes incorporating the first portion with the first set of declarative metadata tags, the first portion including logic used to transform the declarative metadata from a first format to a second format, wherein the second format is different from the first format, and a second portion, the second portion being arranged to extend the first portion;
- interfacing the first test adapter with the diagnostic test interface; and
- executing a test application on a first entity using the first test adapter, wherein the test application is further arranged to specify at least a second entity to be tested and executing the test application causes a first output associated with testing the first entity to be stored in an in-memory data structure and causes the first output associated with testing the first entity to be obtained from the in-memory data structure as a first input associated with testing the second entity.

31. The method of claim 30 wherein creating the first test adapter further includes creating a third portion, the third portion being arranged to marshal and to unmarshal metadata associated with the first type of test from the repository.

32. The method of claim 30 further including:
- creating a first test declarative metadata adapter, the first test declarative metadata adapter being arranged to marshal and to unmarshal metadata associated with the first type of test from the repository.

33. The method of claim 30 wherein the second portion defines at least one declarative metadata tag that is not included in the first set of declarative metadata tags.

34. A computer program product for processing test data, the test data including declarative metadata, within a testing framework, the testing framework having a plurality of adapters including a first adapter arranged to handle the test data, wherein the first adapter has a generic adapter portion and a specialized adapter portion, the generic adapter portion being encompassed in each of the plurality of adapters, the computer program product comprising:
- code devices that cause the test data to be analyzed before creating a test interface object, wherein the code devices that cause the test data to be analyzed before creating a test interface object further comprise code devices that cause a test application to be executed on a first entity using the test interface object and the first adapter, wherein the test application is further arranged to specify at least a second entity to be tested and executing the test application causes a first output associated with testing the first entity to be stored in an in-memory data structure and causes the first output associated with testing the first entity to be obtained from the in-memory data structure as a first input associated with testing the second entity;
- code devices that cause a test interface object to be created, the test interface object being arranged to substantially store the test data as at least a first set of information and a second set of information, wherein the first set of information is substantially associated with declarative metadata and the second set of information is substantially associated with metadata;
- code devices that cause a test of an application program interface using the test interface object; and
- a computer-readable medium that stores the code devices.

35. A computer program product suitable for causing an application programming interface (API) test to execute, the computer program product comprising:
- code devices that cause test data to be obtained, the test data including declarative metadata, the test data being obtained using a test declarative metadata adapter of a first class;
- code devices that cause the test data to be provided to a diagnostic test interface;
- code devices that cause a test associated with the test data to be executed using the diagnostic test interface, wherein the code devices that cause the test associated with the test data to be executed using the diagnostic test interface comprise:
- code devices that cause a first test adapter of the first class to be called to obtain testing logic for executing the test associated with the test data, the first test adapter being in communication with the diagnostic test interface, the first test adapter being arranged to include a generic test adapter portion,
- wherein the first test adapter is capable of transforming metadata from a first format to a second format, the second format is different from the first format, the generic test adapter portion defines at least one tag that is common to a plurality of test adapters of the first class, and a test adapter portion that defines at least one tag that is not common to the plurality of test adapters of the first class; and
- code devices that cause a test application to be executed on a first entity using the first test adapter, wherein the test application is further arranged to specify at least a second entity to be tested and executing the test application causes a first output associated with testing the first entity to be stored in an in-memory data structure and causes the first output associated with testing the first entity to be obtained from the in-memory data structure as a first input associated with testing the second entity; and
- a computer-readable medium that stores the code devices.

36. A computer program product for extending functionality associated with a testing framework, the testing framework being suitable for use in testing application programming interfaces (APIs), the testing framework including a repository arranged to store metadata, a diagnostics execution engine, a diagnostic test interface, and an API test adapter, the API test adapter including a first portion with a first set of declarative metadata tags and a second portion that is arranged to extend the first portion, the API test adapter being in communication with the diagnostic test interface, the computer program product comprising:
- code devices that cause a first test adapter to be created, the first test adapter being arranged to perform a first type of test, wherein the code devices that cause the first test adapter to be created includes code devices that cause the first portion with the first set of declarative metadata tags and a second portion to be incorporated, the second portion being arranged to extend the first portion;
- code devices that cause the first test adapter to transform the first set of declarative metadata tags from a first format to a second format;
- code devices that cause the first test adapter to be interfaced with the diagnostic test interface;
- code devices that cause a test application to be executed on a first entity using the first test adapter, wherein the test application is further arranged to specify at least a second entity to be tested and executing the test application causes a first output associated with testing the first entity to be stored in an in-memory data structure and causes the first output associated with testing the first entity to be obtained from the in-memory data structure as a first input associated with testing the second entity; and
- a computer-readable medium that stores the code devices.

37. The framework of claim 2 wherein the third format is different from the first format.

38. The framework of claim 1 wherein the first declarative metadata in the second format comprises code to be executed on the application program interface.

39. The method of claim 12 comprising:
storing test results from the using the test interface object to test an application programming interface in an XML log file.

40. The method of claim 18 wherein the executing comprises:
executing code of the first declarative metadata on the application program interface.

41. The framework of claim 22 wherein the declarative metadata in the second format comprises code to be executed on the application program interface via the diagnostic test interface.

42. The method of claim 30 wherein declarative metadata in the second format comprises code to be executed on the application program interface.

43. The framework of claim 1 wherein the application program interface comprises functions through which a program application accesses an operating system, and the program application is not part of the application program interface.

44. The method of claim 18 wherein the application program interface does not include a main function that invokes calls to functions available in the application program interface.

45. The framework of claim 22 wherein the application program interface is supplied in source code form in a high level computer language to the diagnostic test interface.

46. The method of claim 30 wherein the application program interface does not comprise a program application.

47. The computer program product of claim 36 wherein the second format is different from the first format.

* * * * *

UNITED STATES PATENT AND TRADEMARK OFFICE
CERTIFICATE OF CORRECTION

PATENT NO. : 7,603,658 B2  Page 1 of 1
APPLICATION NO. : 10/991607
DATED : October 13, 2009
INVENTOR(S) : Sowmya Subramanian et al.

It is certified that error appears in the above-identified patent and that said Letters Patent is hereby corrected as shown below:

In column 6, line 52, delete "commandline" and insert -- command line --, therefor.

In column 12, line 1, delete "PLSQL" and insert -- PL/SQL --, therefor.

In column 12, line 2, delete "PLSQL" and insert -- PL/SQL --, therefor.

In column 13, line 63, in claim 12, delete "interfaces," and insert -- interface, --, therefor.

Signed and Sealed this

Third Day of August, 2010

David J. Kappos
*Director of the United States Patent and Trademark Office*